United States Patent [19]

Taniuchi et al.

[11] Patent Number: 4,793,347

[45] Date of Patent: Dec. 27, 1988

[54] EXHAUST TIMING CONTROL DEVICE FOR TWO CYCLE ENGINES

[75] Inventors: Kazuman Taniuchi; Masayuki Toriyama; Takumi Tottori; Kazumi Shibata, all of Saitama, Japan

[73] Assignee: Honda Giken Kogyo Kabushiki Kaisha, Tokyo, Japan

[21] Appl. No.: 8,524

[22] Filed: Jan. 29, 1987

[30] Foreign Application Priority Data

Jan. 29, 1986 [JP] Japan .................. 61-018381

[51] Int. Cl.⁴ ............................................. F02D 9/06
[52] U.S. Cl. ................................ 123/323; 123/65 PE
[58] Field of Search .............. 123/65 PE, 65 S, 321, 123/322, 90.15, 323

[56] References Cited

U.S. PATENT DOCUMENTS

| | | | |
|---|---|---|---|
| 4,121,552 | 10/1978 | Mithuo | 123/65 PE |
| 4,202,297 | 5/1980 | Oku | 123/65 PE |
| 4,333,431 | 6/1982 | Iio | 123/323 |
| 4,341,188 | 7/1982 | Nerstrom | 123/324 |
| 4,364,346 | 12/1982 | Shiohara | 123/323 |
| 4,388,894 | 6/1983 | Tanaka | 123/65 PE |
| 4,391,234 | 7/1983 | Holzleitner | 123/65 V |
| 4,399,788 | 8/1983 | Bostelmann | 123/323 |
| 4,494,506 | 1/1985 | Hayama | 123/348 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |
| 4,651,684 | 3/1987 | Masuda | 123/90.16 |

FOREIGN PATENT DOCUMENTS

| | | |
|---|---|---|
| DE 3232786A1 | 4/1984 | Fed. Rep. of Germany . |
| 47-36047 | 9/1972 | Japan . |
| 51-21038 | 2/1976 | Japan . |
| 51-39112 | 3/1976 | Japan . |
| 51-42497 | 4/1976 | Japan . |
| 51-74623 | 6/1976 | Japan . |
| 51-147813 | 11/1976 | Japan . |
| 52-18333 | 4/1977 | Japan . |
| 52-132916 | 10/1977 | Japan . |
| 54-158514 | 12/1979 | Japan . |
| 55-160107 | 12/1980 | Japan . |
| 56-27014 | 3/1981 | Japan . |
| 56-47609 | 4/1981 | Japan . |
| 57-62917 | 4/1982 | Japan . |
| 57-105511 | 7/1982 | Japan . |
| 58-7059 | 2/1983 | Japan . |
| 58-7060 | 2/1983 | Japan . |
| 58-36818 | 8/1983 | Japan . |
| 59-7008 | 2/1984 | Japan . |
| 59-105928 | 6/1984 | Japan . |

Primary Examiner—Henry A. Bennet
Attorney, Agent, or Firm—Lyon & Lyon

[57] ABSTRACT

An exhaust timing controller for controlling an exhaust timing member in a two cycle engine including a control circuit for generating a control signal which actuates a mechanism for moving the exhaust timing member. The control circuit controls the member such that the member is drivable in a range from a fully open position to a fully closed position responsive to certain engine conditions including engine speed and rate of change of engine speed. A self cleaning cycle is provided which drives the exhaust timing member first to one position limit and then to the other.

6 Claims, 5 Drawing Sheets

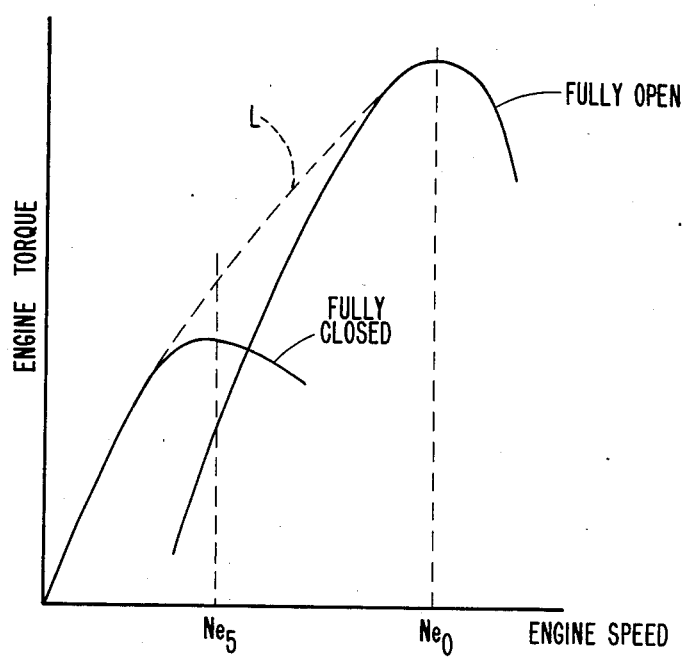
FIG. 6.
FIG. 7.
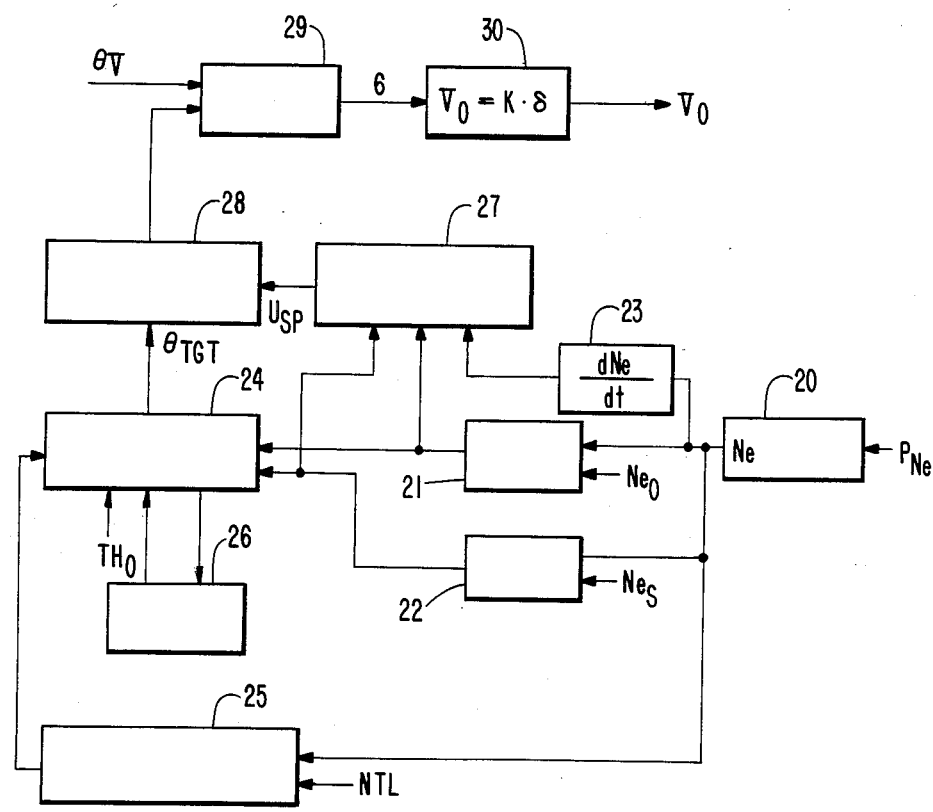

EXHAUST TIMING CONTROL DEVICE FOR TWO CYCLE ENGINES

BACKGROUND OF THE INVENTION

The field of the present invention is exhaust timing control devices for two cycle engines.

Japanese Utility Model Publication No. 51-39112 (39112/1976), the disclosure of which is incorporated herein by reference, discloses an exhaust timing control device which controls the initiation of the exhaust cycle in a two cycle engine to increase power. This exhaust timing control device is provided with a member which can move to a position on an upper portion of an exhaust port in a two cycle engine. In this position, the member controls the timing edge location of the exhaust port in accordance with the speed of the engine to adjust the exhaust timing.

Japanese Utility Model Publication No. 52-132916, the disclosure of which is incorporated herein by reference, discloses another exhaust timing control device. The device senses the operational position of an operating member in the driving mechanism for the exhaust timing member relative to a reference position. From this, the position of the exhaust timing member is controlled according to the engine speed.

In the foregoing devices, the exhaust timing is responsive solely to engine rotational speed. Naturally, a variety of other parameters of engine operation can affect optimum exhaust timing in addition to engine speed.

SUMMARY OF THE INVENTION

The present invention is directed to an exhaust timing control system and method for a two cycle engine which provides for smooth engine operation responsive to engine conditions. An exhaust timing member is controlled as a function of certain engine parameters including the acceleration of the engine. Thus, more responsive engine operation can be realized.

A motor may be employed to actuate the timing member which may in turn be controlled by a voltage generator circuit actuated by signals from a CPU within a control circuit. In one aspect of the present invention, the control circuit may include wave shaping, memory, A/D conversion, throttle interface, and ignition key switch setting circuits. In operation, the foregoing circuitry may receive ignition pulse, throttle, transmission and timing member position data input to the control circuit. Through a series of programmed steps the CPU within the control circuit can activate the voltage generator circuit causing the motor, through the timing member driving mechanism, to move the timing member to a desired position responsive to a number of parameters including the acceleration of the engine.

Accordingly, it is an object of the present invention to provide improved two cycle engine operation. Other and further objects and advantages will appear hereinafter.

BRIEF DESCRIPTION OF THE DRAWINGS

In the drawings wherein similar reference characters denote similar elements throughout the several views:

FIG. 6 is a graph plotting engine torque versus the rotational speed of the engine, with the exhaust timing member fully open and fully closed; and FIG. 7 is a block diagram illustrating the operation of the CPU as illustrated by the flow charts in FIGS. 3, 4 and 5.

DETAILED DESCRIPTION OF THE PREFERRED EMBODIMENT

Figure 1:
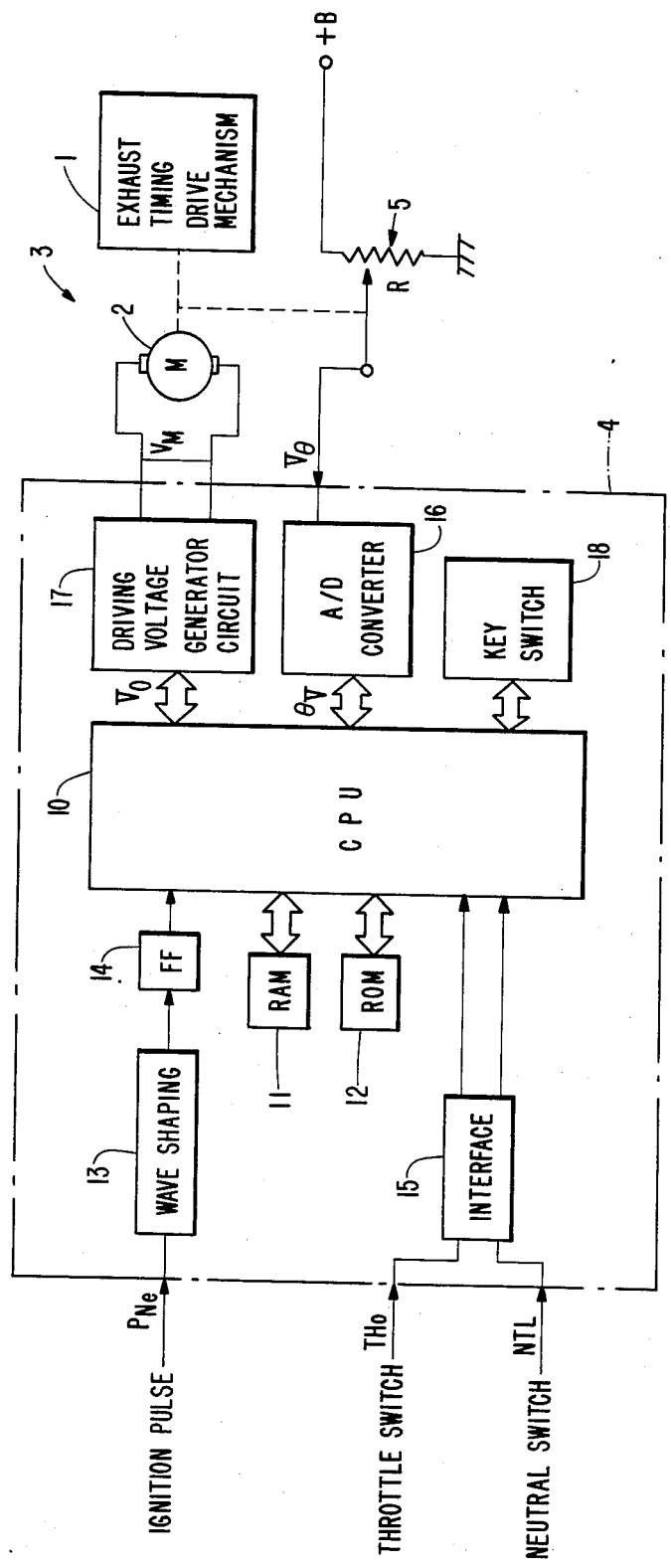
FIG. 1 is a schematic block diagram illustrating an exhaust timing control system according to the present invention.

Referring now to FIG. 1, an exhaust timing control device is illustrated according to the present invention. The device includes an exhaust timing member driving means 3 including a driving mechanism 1 for an exhaust timing member (not shown). The exhaust timing member adjusts an upper edge of the position of an exhaust port of a two cycle engine. Also included in the exhaust timing member driving means 3 is a D/C motor 2 for supplying power to the driving mechanism 1. The motor 2 is supplied with driving voltage $V_M$ from a control circuit 4 so as to move the exhaust timing member to a desired position. The control circuit 4 determines the driving voltage $V_M$ from a plurality of inputs. An ignition pulse $P_{Ne}$ obtained from an ignition circuit and having a frequency proportional to the rotational frequency of the engine is input to the control circuit 4. The ignition circuit may be, for example, a capacitor discharge type. Also input to the control circuit 4 is a signal $TH_o$ from a throttle switch (not shown), activated when the engine throttle is opened to or beyond a preset amount. In the present embodiment, the preset amount is set at the fully open throttle position. Additionally, a voltage $V_\theta$ from an exhaust timing member position sensor 5 which includes, for example, a potentiometer R is input to the control circuit 4.

The position of the exhaust timing member may include and the control system may differentiate among a first position limit or fully closed position $\theta_s$, an intermediate range of positions $\theta_p$ and a second position limit or fully open position $\theta_o$. The initiation of the exhaust cycle is earliest in the fully open position $\theta_o$ and is retarded as the exhaust timing member is moved toward the fully closed position $\theta_s$. Furthermore, the middle position $\theta_p$ is not limited to one value. Rather, it may include a plurality of middle positions according to the rotational frequency of the engine irrespective of the throttle setting.

Also input to the control circuit 4 is a neutral signal NTL generated from a neutral switch which is switched on when the transmission associated with the engine is in the neutral position. This switch acts to execute a self-cleaning mode with the transmission in neutral.

The control circuit 4 includes a microcomputer in which a CPU 10 and memories RAM 11 and ROM 12 or the like are connected in a well known manner via bus lines. The ignition pulse $P_{Ne}$ is processed by a wave shaping circuit 13 having, e.g., a one shot multivibrator and by a flip-flop circuit 14, with the ignition pulse $P_{Ne}$ being received into the CPU 10 as rotational frequency data Ne(N). The throttle signal $TH_o$, in this embodiment reflecting a fully open throttle, is simultaneously supplied to an appropriate port of the CPU 10 via an interface circuit 15.

The exhaust timing member position sensor 5 generates an angular position signal $V_\theta$ which indicates, for example, the position or angle of rotation of the electric motor 2, or the displacement from a reference position of an appropriate member of the exhaust timing mechanism 1. The angular position signal $V_\theta$ is digitized by an A/D converter 16 and is received into the CPU 10 as data $\theta_y(N)$ via a bus line.

On the basis of the data Ne(N), $TH_o$, NTL and $\theta_y(N)$, the CPU 10 determines an optimum opening for the exhaust timing member and supplies command voltage data $V_o$ corresponding to this optimum opening to a driving voltage generator circuit 17. The command voltage data $V_o$ includes bits which indicate respectively the plus and minus polarity of the voltage and its magnitude. The driving voltage generator circuit 17 generates a motor driving voltage $V_M$ supplied to the electric motor 2 on the basis of the data $V_o$. A key switch 18 such as an ignition switch facilitates providing the CPU 10 with commands which set a desired initialized condition in a main routine, as further described hereinafter.

Figure 2:
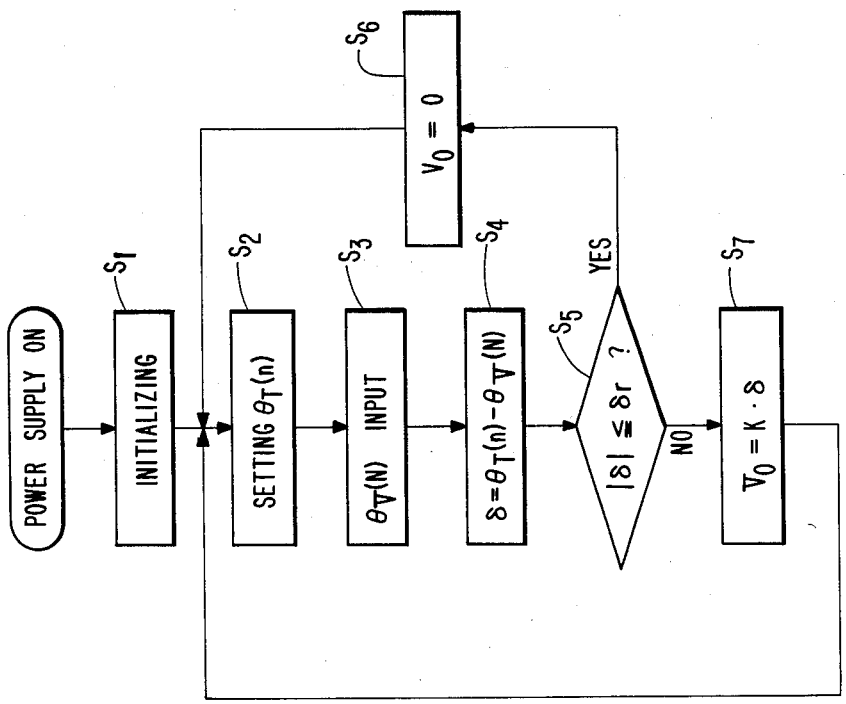
FIG. 2 is a flow chart illustrating the routine in the CPU of FIG. 1 for adjusting the degree of opening of the timing member.

FIG. 2 is a flow chart showing the CPU routine for adjusting the opening of the exhaust timing member. This routine is synchronized with a clock pulse from a self-contained clock generator in the CPU 10.

A power voltage is supplied from a regulated power supply (not shown) to the control circuit 4, for example, by switching on an ignition switch, thereby activating the control circuit 4. The clock pulse is generated from the self-contained clock generator circuit, and the routine is performed with each clock pulse. In this routine, the initialization function is performed immediately after turning on the power supply (step $S_1$). This initialization function is usually carried out in the microcomputer and, for example, includes a function for setting the timing member at an initial provisional timing member target position $\theta_T(n)$.

The provisional target position $\theta_T(n)$ is set from memory (step $S_2$). The provisional target position $\theta_T(n)$ is either established as part of the initialization function or is calculated in the overflow interrupt routine discussed hereinafter with reference to FIG. 5 as in turn based on the values calculated in the flow chart of FIG. 4. A value $\theta_y(N)$ of the actual measured exhaust timing member position is then received (step $S_3$). Then, the difference $\delta$ (including the plus and minus signs) between $\theta_T(n)$ and the $\theta_y(N)$ is derived (step $S_4$), and the absolute value of the difference $/\delta/$ and the threshold value $\delta r$, are compared (step $S_5$). If $/\delta/$ is smaller than the threshold value $\delta r$, the output voltage data $V_o$ is set at zero (step $S_6$) and step $S_2$ is reentered taking in $\theta_T(n)$. The threshold value $\delta r$ is determined within a maximum margin of error including the possibility that $\theta_T(n)$ and $\theta_y(N)$ have coincided with each other, and ideally, $\delta r$ is zero. When $/\delta/ > \delta r$, the opening of the exhaust timing member has not reached the desired position. Accordingly, an output voltage $V_o$ having a value proportional to the difference $\delta$ (step $S_7$) is generated.

The driving voltage generator circuit 17, when receiving the data $V_o$ set by the main routine, drives the electric motor 2 by bringing the value of the motor driving voltage $V_M$ to 0, $-V_M$, or $+V_M$, according to the value of $V_o$ (either 0, $-V$, or $+V$). The electric motor is then correspondingly stopped, or turns in a reverse or forward direction. The actual position of the exhaust timing member is accordingly changed to the desire position by the operation of the driving mechanism 1. In the driving voltage generator circuit 17, one or the other of the plus and minus power voltages $V_M$ or neither may be connected according to the value of $V_o$ to the output terminal.

Figure 3:
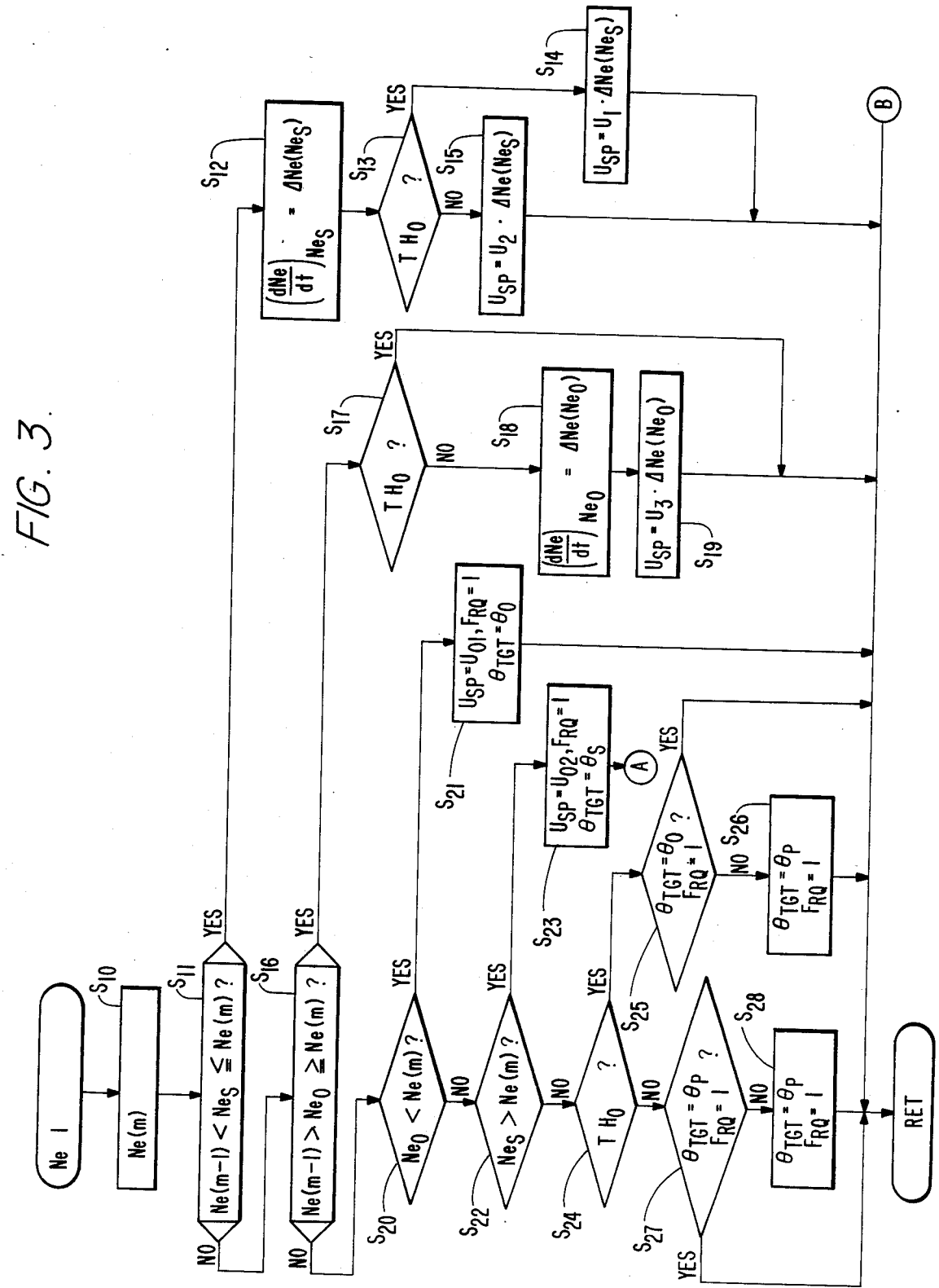
FIG. 3 is a flow chart illustrating a subroutine function performed for every ignition pulse in the CPU of FIG. 1.

FIG. 3 is a flow chart demonstrating a subroutine performed for every ignition pulse $P_{Ne}$ in the CPU 10. In this routine, a self-contained counter is triggered by the ignition pulse $P_{Ne}$ so as to count the rotational frequency, or speed, of the engine Ne(m) with the data showing a reciprocal of a pulse distance between tee ignition pulses $P_{Ne}$ (step $S_{10}$). Then, the last preceding value Ne(m−1) of the data of the rotational frequency is compared with a fully closed threshold value $Ne_s$, the speed of the engine at which point the timing member is desired to be fully closed, and it is determined whether the last preceding value Ne(m−1) satisfies the relationship Ne(m−1)$<Ne_s\leq$Ne(m) or not (step $S_{11}$). When this inequality relationship exists, it is sensed as a moment when the rotational frequency Ne of the engine has exceeded the fully closed threshold value $Ne_s$. In this case, the change in speed, that is, an acceleration (dNe/dt) $Ne_s$ of the rotational frequecy Ne of the engine is counted at that time (step $S_{12}$). Here, (dNe/dt) $Ne_s$ is represented as $\Delta$ Ne ($Ne_s$). Then, the presence or absence of the fully opened throttle signal $TH_o$ is determined (step $S_{13}$). In the presence of the signal $TH_o$, the amount of step $U_{sp}$ is selected as the fully open amount of step $U_{spo}=U_1.\Delta Ne(Ne_s)$ (step $S_{14}$). In the absence of $TH_o$, the amount of step $U_{sp}$ is operated as the first middle opening amount of step $U_{spp1}=U_2.\Delta Ne(Ne_s)$ (step $S_{15}$) and enters nnto the return function. Here, $U_1$, $U_2$ are constant, preferably with $U_1 > U_2$.

When the inequality Ne(m−1)$<Ne_s\leq$N(m) does not exist, the control device decides whether the inequality Ne(m−1)$>Ne_o\geq$Ne(m) is valid or not (step $S_{16}$). If this inequality is valid, it is a moment when the rotational frequency Ne of the engine is less than the fully open threshold value $Ne_o$. In preparation for closing the timing member, presence of the fully open signal $TH_o$ of the throttle is determined (step $S_{17}$). In the presence of $TH_o$, the control device enters into the return function without performing other steps. On the other hand, in the absence of the $TH_o$, the exhaust timing member is adapted to the middle opening position $\theta_p$. After calculating (dNe/dt) $Ne_o=\Delta Ne(Ne_o)$ (step $S_{18}$), the amount of step $U_{sp}$ is considered as the second middle amount of step, $U_{spp2}=U_3.\Delta Ne(Ne_o)$ (step $S_{19}$). Further, $U_3$ is a constant and as $U_2=U_3$, $U_{spp1}$ may equal $U_{spp2}$.

When the inequality of step $S_{16}$ is not valid, the present value of the rotational frequency of the engine Ne(m) compared with the fully open threshold value $Ne_o$ (step $S_{20}$). When Ne(m) is larger than $Ne_o$, the final target position $\theta_{TGT}$ is set at the fully open position data $\theta_o$ and the amount of step $U_{sp}$ is set at a predetermined value $U_{o1}$. Simultaneously, an opening and closing demand flag $F_{RQ}$ is set up and the return function is entered (step $S_{21}$).

When Ne(m) is less than $Ne_o$, Ne(m) is compared with $Ne_s$ (step $S_{22}$). When Ne(m) is less than $Ne_s$, the final target position $\theta_{TGT}$ is set at the fully closed position $\theta_s$. Simultaneously, $F_{RQ}$ is set up and the routine proceeds to the self-cleaning mode (step $S_{23}$). The amount of step $U_{sp}$ is put into the required value $V_{o2}$. If Ne(m) is larger than Ne$_s$, Ne(m) is between the Ne$_s$ and the Ne$_o$, and then the presence of the fully open throttle TH$_o$ is checked (step S$_{24}$). When TH$_o$ exists, the control device checks whether the timing member is being moved toward full open, that is, whether the conditions of $\theta_{TGT}=\theta_o$ and F$_{RQ}=1$ are satisfied or not (step S$_{25}$). If they are satisfied, the return function is entered without other steps. If it is not valid, the return function is entered as $\theta_{TGT}=\theta_o$ and F$_{RQ}=1$ (step S$_{26}$). In the absence of the fully open throttle signal TH$_o$, the opening of the exhaust valve is set to the middle opening position $\theta_p$, and the condition of movement to the middle opening position, that is, the condition of $\theta_{TGT}=\theta_p$ and F$_{RQ}=1$ is established (step S$_{27}$). If this condition is satisfied, the return function is entered without other steps. If the condition is not satisfied, the return function is entered as $\theta_{TGT}=\theta_p$ and F$_{RQ}=1$ (step S$_{28}$). By the aforementioned function modes, the final intended value $\theta_{TGT}$ and the amount of step U$_{sp}$ are continuously updated and are always the optimum value for every P$_{Ne}$ pulse.

Figure 4:
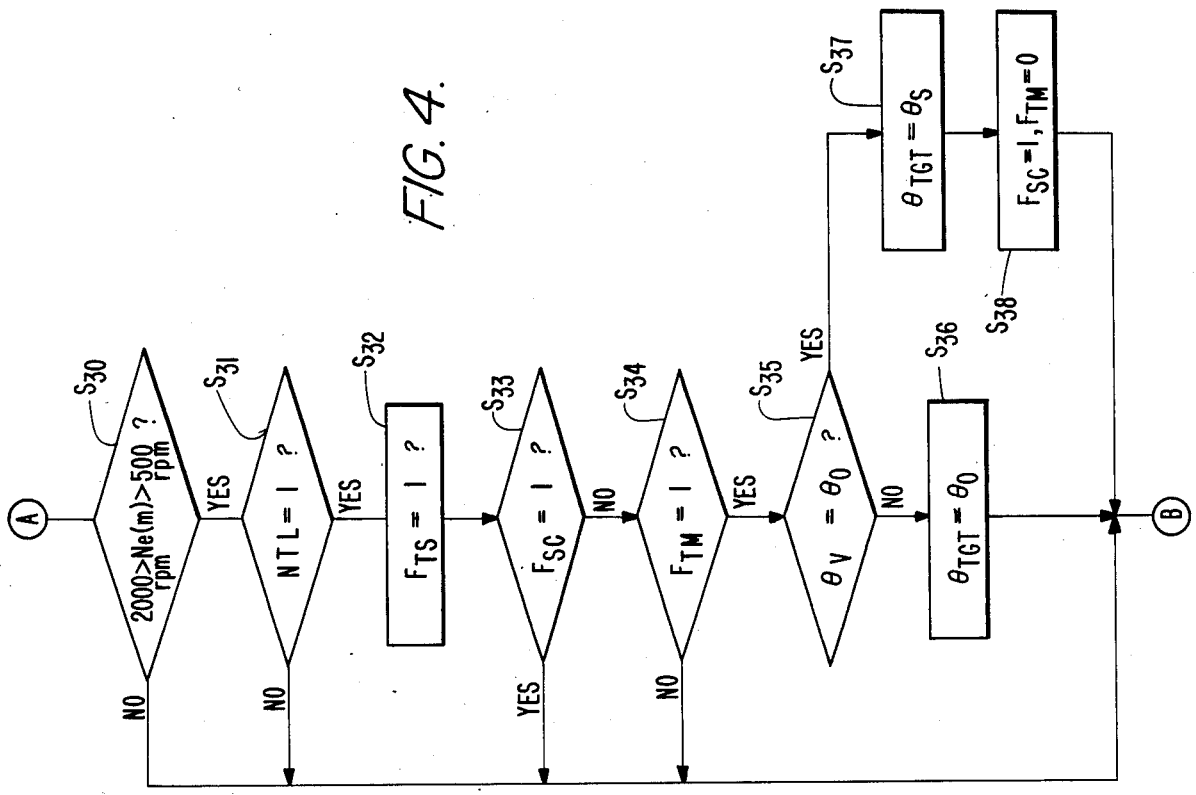
FIG. 4 is a flow chart illustrating the self-cleaning subroutine.

FIG. 4 is a flow chart illustrating the self-cleaning mode referred to above. First, the engine speed Ne(m) is checked to see if it is in the idle or low speed region of 500 rpm to 2000 rpm, for example (Step S$_{30}$). Then, the neutral signal NTL is checked to see if it is on, NTL=1 (step S$_{31}$). If NTL equals 1, the gear shift is in the neutral position and a measurement start flag F$_{TS}$ is set to 1 (step S$_{32}$).

After determining that the engine speed and the gear shift position are proper for self cleaning, a determination is made as to whether self cleaning has already been performed (step S$_{33}$). Initially, a self-cleaning completion flag F$_{sc}$ is set at 0. Once cleaning is complete, the flag is set at 1. If F$_{sc}$ equals 1, the routine is returned. If F$_{sc}$ equals 0, a determination is made as to whether or not a measurement completion flag F$_{TM}$ is 1 (step S$_{34}$). If F$_{TM}$ equals 0, the routine is returned. If F$_{TM}$ equals 1, the low speed condition of the engine is maintained for at least a minimum time, e.g., about one second, and the routine proceeds to a forced operation mode of the exhaust timing member for self cleaning.

To carry out the self-cleaning operation, first $\theta_v(N)$ is compared with 0 (step S$_{35}$). When $\theta_o$ is not equal to $\theta_v(N)$, a target position $\theta_{TGT}$ is set to $\theta_o$ (step S$_{36}$), thereby entering into a return function. Then when $\theta_v(N)$ becomes equal to $\theta_o$ by moving the exhaust timing member open, the target position $\theta_{TGT}=\theta_s$ (step S$_{37}$). When $\theta_v(N)=\theta_s$, the self-clenaing operation is complete and the self-cleaning complete flag is set, F$_{sc}=1$ (step S$_{38}$), and the measurement start flag F$_{TM}$ is set to 0 (step S$_{39}$).

The self-cleaning complete flag F$_{sc}$ is set to 0 in the initialization step S$_1$ of the main routine. It is also possible to perform the desired number of the self-cleaning functions in such a manner that the function is performed until K becomes a maximum value by having F$_{sc}$ taken as a constant K so that K=K+1 for every termination of one self-cleaning function cycle. As an option, when a determination is made that NTL is 0 at step S$_{31}$, F$_{sc}$ may be set to 0. Under such conditions, self cleaning would be carried out at any time when the engine is in the low speed condition and the gear shift is in the neutral position. As a modification, step S$_{30}$ may be omitted to carry out the self-cleaning operation at any time when the gear shift position is in the neutral position. As a further modification, step S$_{33}$ may be arranged prior to step S$_{30}$.

The flow chart of FIG. 4 is performed by interrupting the main routine with every engine ignition pulse P$_{Ne}$. A provisional target value setting mode serves to control a function mode which determines a present provisional target value $\theta_T(N)$. $\theta_T(N)$ is established by the function mode with respect to the finally intended or final target value $\theta_{TGT}$ such that $\theta_T(N)$ gradually approaches $\theta_{TGT}$. The provisional target value setting mode is performed by an overflow interrupt routine which employs a timer (not shown) to count by means of the clock self-contained in the CPU and which is performs for every desired time. The overflow interrupt routine is at the same level as the interrupt routine executed for every ignition pulse P$_{Ne}$, and each routine does not interrupt the other.

Figure 5:
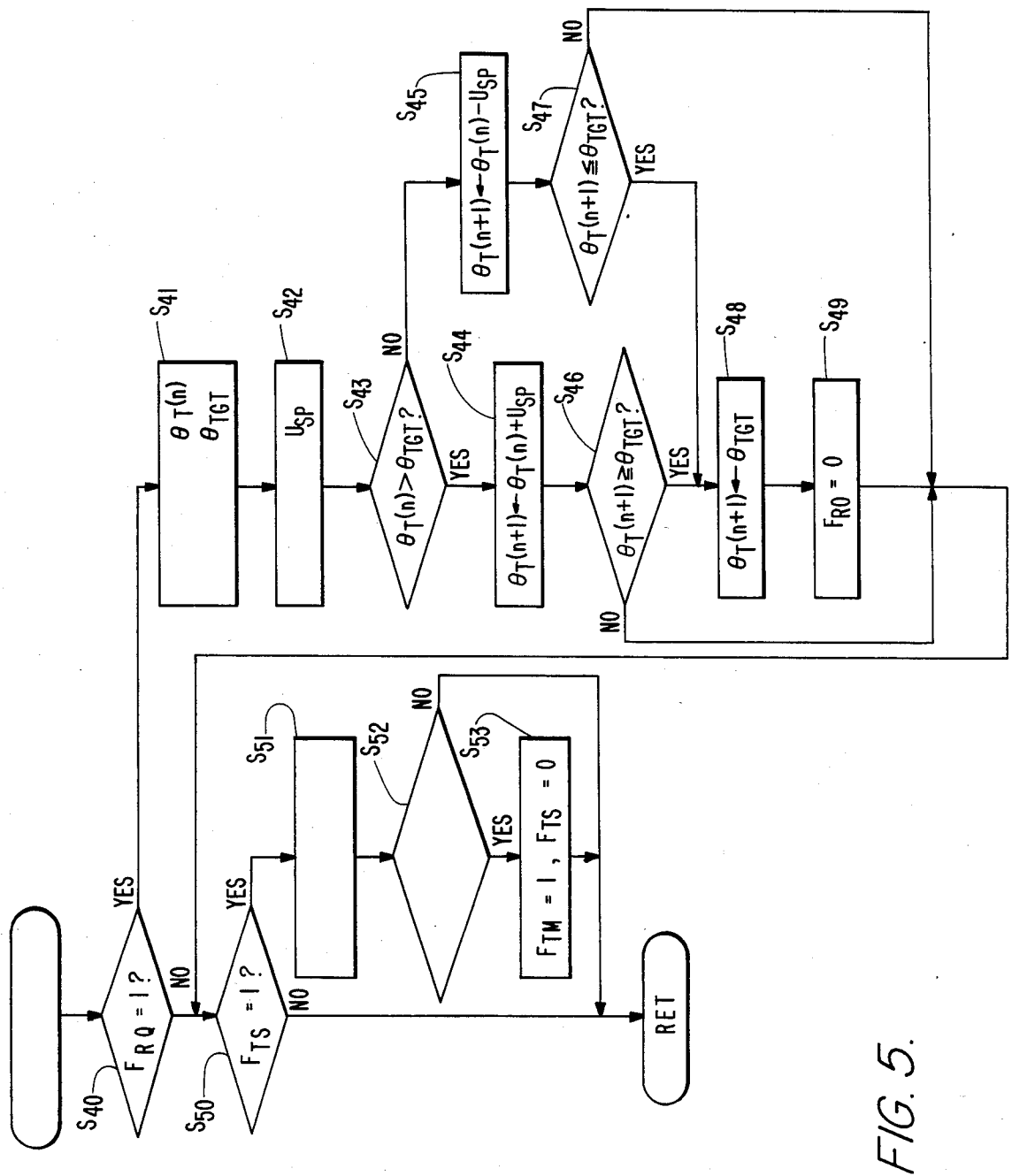
FIG. 5 is a flow chart illustrating the overflow interruption routine.

FIG. 5 is flow chart which shows the overflow interrupt routine for execution of the provisional target value setting mode and the counting mode. First, when the self-contained timer overflows, the control system determines whether the opening and closing demand flag F$_{RQ}$ is present (1) or not (0) (step S$_{40}$). If F$_{RQ}=0$, the routine enters into a timer mode as mentioned hereinafter. If F$_{RQ}=1$, the provisional target value setting mode is to be performed. The present provisional value $\theta_T(n)$ and the final target value $\theta_{TGT}$ are taken from the memory (step S$_{41}$). Then, the amount of step U$_{sp}$ therein is received (step S$_{42}$). By comparing magnitudes of $\theta_{TGT}$ and $\theta_T(n)$ thus taken, a decision is made whether to open or close the timing member (step S$_{43}$). If $\theta_T(n)$ is greater than $\theta_{TGT}$, the provisional target value is changed by taking $\theta_T(n)+U_{sp}$ as a final value to increase the provisional target opening degree by the amount of step U$_{sp}$ (step S$_{44}$). Conversely, if $\theta_T(n)$ is less than $\theta_{TGT}$, the provisionally aimed opening degree $\theta_T(n)$ is decreased by the amount of step U$_{sp}$, as $\theta_T(n+1)=\theta_T(n)-U_{sp}$ (step S$_{45}$). Then, by comparing the magnitudes of $\theta_{TGT}$ and $\theta_T(n-1)$ (step S$_{46}$, S$_{47}$), if $\theta_T(n+1)$ does not attain $\theta_{TGT}$, $\theta_T(n+1)$ is made to be equal to $\theta_{TGT}$ (step S$_{48}$), whereby the opening and closing demand flag FRQ is set to zero to release it and this mode is terminated (step S$_{49}$).

When the provisional target opening angle setting mode is ended, the routine proceeds to the timer mode. The measurement start flag F$_{TS}$ is tested to see if it is set, F$_{TS}=1$ (step S$_{50}$). If the measurement start flag F$_{TS}$ is 0, the routine is returned. If F$_{TS}=1$, a neutral timer incorporated in the CPU is incrementally operated by a unit bit (step S$_{51}$). A determination is then made whether or not the time period for the neutral timer has ended (step S$_{52}$). If it has, the measurement completion flag F$_{TM}=1$, and F$_{TS}=0$ are set (step S$_{53}$). As an alternative, the setting of F$_{TS}=1$ may be carried out at the initialization step S$_1$ and the main routine shown in FIG. 2 instead of at step S$_{32}$.

FIG. 6 shows the relationship of engine torque to engine speed having the positioning of the timing member as a parameter of engine speed. When the engine rapidly accelerates, the timing member experiences prompt actuation and the torque rises smoothly, as shown by the dotted line L. There is no reduction in torque as would be experienced with a conventional engine with one setting or a controlled engine exhaust port with the member controlled to be either fully open or fully closed.

FIG. 7 shows a block diagram which illustrates the operating functions of the CPU 10 shown in the flow charts of FIGS. 3 to 5. Operating means 20 generates the data Ne of rotational frequency on the basis of the ignition pulse $P_{Ne}$. The data Ne of rotational frequency is compared with the fully open threshold value $Ne_o$ and the fully closed threshold value $Ne_s$ by means of first and second comparator means 21, 22. The Ne data is differentiated by means of differentiator means 23. Means 44 for setting the final target value sets $\theta_{TGT}$ according to the signal from the first and second comparator means 21, 22 and the fully open signal $TH_o$ of the throttle. Further, the control device may perform the forced setting of the fully open and fully closed opening upon performing the self-cleaning operation mode, which cooperates with the signal from self-cleaning decision means 25 and the timer 26.

Means 27 for setting the step amount operate with the signal from the comparator means 21, 22 and the differentiator means 23. Means 28 for setting the provisional target opening degree sets the provisionally aimed opening $\theta_T$ according to the step amount $U_{sp}$ from the means 27 for setting the step amount and according to the finally aimed opening degree $\theta_{TGT}$ from the means 24 for setting the final target opening degree. Subtraction means 29 computes the difference $\delta = \theta_v - \theta_T$ between the $\theta_T$ thus obtained and the real opening degree $\theta_v$ of the exhaust timing member and supplies this difference to multiplier means 30. The multiplier means 30 calculates $V_o = K \cdot \delta$ and outputs the result as a driving voltage data $V_o$ for the timing member.

The behavior of the circuit shown in the block diagram of FIG. 7 is adapted to actuate at the same parameters as that shown in the flow charts of FIGS. 2 to 5.

According to the foregoing, the exhaust timing control device determines the exhaust timing member position according to either engine speed or other engine parameters. The member opening and closing operation is controlled by a feed-back control at a rate corresponding to the change rate of the engine speed. The actual exhaust timing member position is monitored so as to let the member reach the target opening angle. Accordingly, exhaust timing may be carried out according to engine operating conditions.

The step amount of change set in the provisional target position is determined at fixed periods so as to let the target reach the final target according to the rate of change of the engine speed. Accordingly, rapid adjustments are made with rapid engine speed changes.

Thus, an exhaust timing control device is disclosed for a two cycle engine wherein the opening degree of an exhaust port timing member is adjusted according to the engine operating state to effect optimum exhaust timing and a cleaning cycle is provided to prevent disabling buildups on the member. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An exhaust timing controller for controlling an exhaust timing member in a two cycle engine, comprising
   a control circuit responsive to more than one engine parameter for generating a working control signal, said engine parameters including engine speed;
   means for determining the rate of change in engine speed;
   means for producing a working control signal responsive to said rate of change in engine speed; and
   means for driving the exhaust timing member operatively connected to said control circuit to receive said working control signal.

2. The exhaust timing controller of claim 1, wherein said engine parameters further include the position of an electric motor and an open throttle condition, said open throttle condition existing when the throttle is open beyond a certain predetermined position.

3. The exhaust timing controller of claim 1, wherein a self-cleaning operation is performed when said engine parameters are in a predetermined state.

4. An exhaust timing controller for controlling an exhaust timing member in a two-cycle engine, comprising
   means for calculating a final target value of the exhausting timing member in response to engine speed;
   means for calculating an amount of controlled steps in response to rate of change in engine speed; and
   means for driving the exhaust timing member so that the final target value is reached using the amount of said controlled steps.

5. The exhaust timing controller of claim 4 wherein said means for driving comprises a driving mechanism for the exhaust timing member for adjusting an upper edge position of an exhaust port of said two-cycle engine.

6. The exhaust timing controller of claim 4, wherein the amount of said controlled steps increases when said rate of change in engine speed is increased.

* * * * *